Oct. 18, 1938.  W. E. ECCLES  2,133,918
METHOD OF MAKING BIMETALLIC FINGER RINGS
Filed March 15, 1938   2 Sheets-Sheet 2
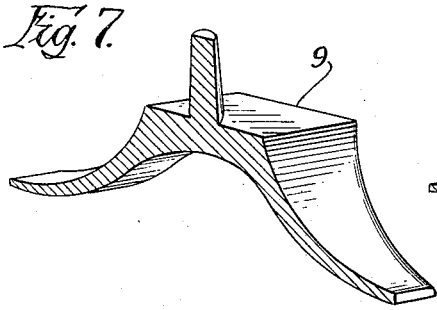
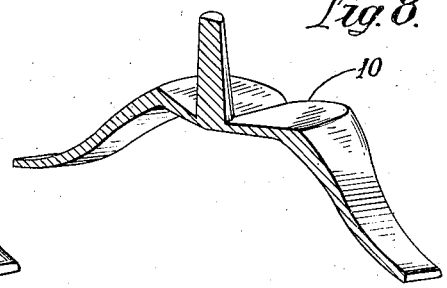
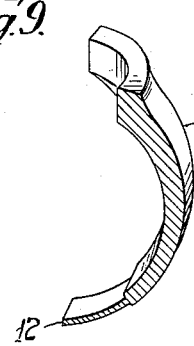
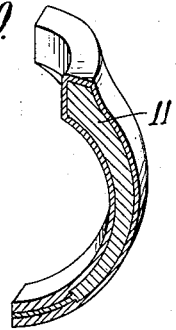
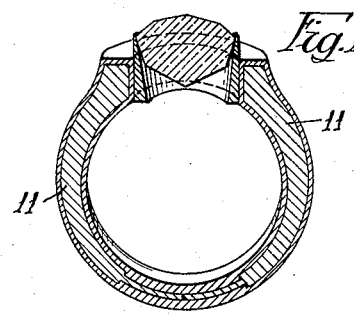
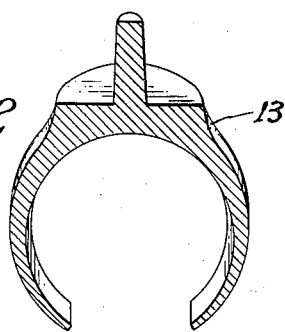
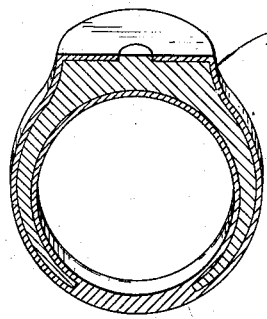
Inventor:
William E. Eccles,
By:
George L. Chindahl
Attorney.

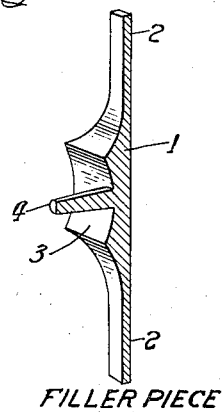
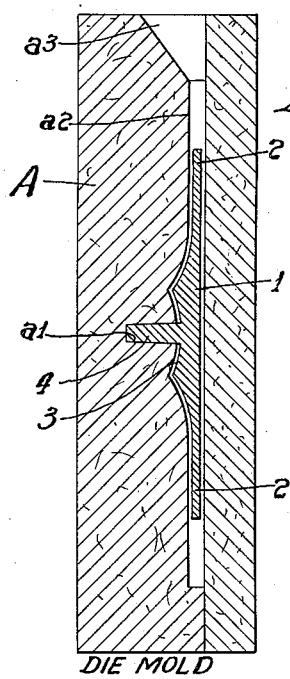
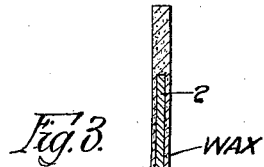
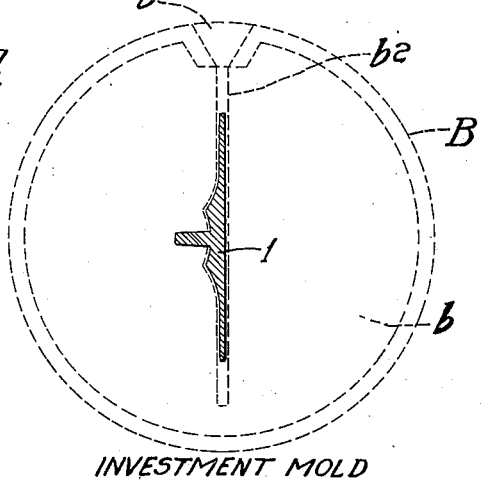
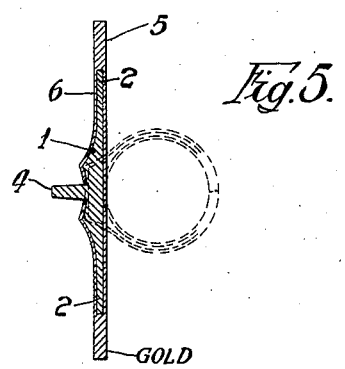
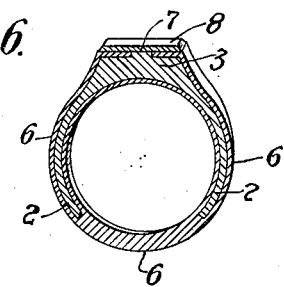

Patented Oct. 18, 1938

2,133,918

UNITED STATES PATENT OFFICE 2,133,918

METHOD OF MAKING BIMETALLIC FINGER RINGS

William E. Eccles, Owatonna, Minn., assignor to The Josten Manufacturing Company, Owatonna, Minn., a corporation of Minnesota Application March 15, 1938, Serial No. 196,045

6 Claims. (Cl. 29—160.6)

This invention relates to the art of making bimetallic finger rings, more particularly that type of ring used extensively with school, fraternity or class emblems imposed thereon.

The general object of this invention is to produce a ring having an inner or filler piece of base material and an outer portion of gold, which shall possess the wearing qualities and appearance of a solid gold ring; and the special object of the invention is to produce a bimetallic ring having no solder seam or the like between the inner and outer portions, thereby obviating the possibility of a solder seam being visible or becoming discolored or opening up when the ring is worn.

These objects are attained by surrounding the filler piece with gold by means of a casting process.

In the accompanying drawings, Figure 1 is a longitudinal central section, in perspective, of one form of filler piece which may be employed in practicing my invention.

Fig. 2 is a sectional view of a die mold, with said filler piece positioned therein.

Fig. 3 is a longitudinal sectional view of said filler piece with a layer of wax cast thereon by means of said die mold.

Fig. 4 is a central vertical sectional view of an investment mold with said filler piece positioned therein, the wax having been removed by melting.

Fig. 5 is a longitudinal sectional view of said filler piece after a covering of noble metal has been cast thereon in said investment mold.

Fig. 6 is a central sectional view, in perspective, of the completed ring.

Fig. 7 is a longitudinal central section, in perspective, of a filler piece adapted for making a finger-ring blank of the "camel-back" type.

Fig. 8 is a similar view of a filler piece adapted for making a finger ring blank of a variation of the camel-back type.

Fig. 9 is a similar view of a filler piece adapted for making finger ring blanks in two halves.

Fig. 10 is a longitudinal central section, in perspective, of the filler piece of Fig. 9 after a covering of noble metal has been cast thereon in an investment mold.

Fig. 11 is a central sectional view, in perspective, of a completed finger ring made from two blanks as shown in Fig. 10.

Fig. 12 is a central sectional view, in perspective, of a filler piece for use in making a circular bimetallic blank.

Fig. 13 is a central sectional view, in perspective, of such a circular bimetallic blank.

For the sake of brevity in description, I shall use the term "base" as denoting the bronze, silver or other relatively inexpensive material of which the filler piece is made, and the term "noble" to designate the gold or other relatively costly material of which the exterior of the ring is formed.

As will be evident from the foregoing brief description of the drawings, the filler piece may partake of various forms. For convenience in describing the process, I shall first refer to the form of filler piece illustrated in Fig. 1, said piece being designated 1. It consists of two shank portions 2 extending in the same plane and a central portion having a concave surface 3 extending transversely of the filler piece. From the middle of the concave surface 3 projects a stem 4 which may be of the form shown or variations thereof. The filler piece may be made in an embossing die or in any other desired manner. The stem 4 is for use in securing the filler piece within the die mold and the investment mold hereinbefore mentioned. If desired, a plurality of mounting stems may be provided on the surface 3 to hold the filler piece firmly in position in said molds.

The die mold A may be of any preferred sectional construction, with a recess $a^1$ to receive and hold the stem 4; a mold cavity $a^2$ of any desired form to contain the body of the filler piece with casting space between the cavity walls and the body of the filler piece; and a pouring opening $a^3$. The walls of the cavity $a^2$ may or may not have the design for the finished ring engraved in intaglio thereon.

The filler piece having been positioned within the die mold, molten plastic material, as, for example, wax, is poured into the mold, whereby the filler piece (with the exception of the stem 4) is covered or surrounded with a layer of wax corresponding in thickness to the thickness of noble material with which the filler piece is subsequently to be covered.

After the wax has set, the filler piece is removed from the die mold, and covered with plastic material (hereinafter termed "investment material") which, when hard, is suitable for use in casting the noble material, as, for example, dental investment material. In Fig. 4 the investment material is designated $b$. The flask in which the investment material is contained is marked B. The stem 4 is embedded in the investment material.

After the investment material has set, the wax is removed, either by heating the investment mold and its contents sufficiently to melt the wax, the latter being poured out of the mold through the opening $b^1$, or (preferably) by heating the mold and its contents to a dull red to cause the wax to burn up and to heat the filler piece. In either case the filler piece remains positioned in the mold B by means of the stem 4. The space $b^2$ from which the wax was removed completely surrounds the body of the filler piece.

The desired noble metal, as, for example, molten gold of the required carat, is then poured or forced into the investment mold B through the opening $b^1$ by means of air or centrifugal force, filling the space $b^2$. If the wax was burned out, the heated filler piece becomes bonded to the gold.

After the noble metal has set, the investment mold is broken up and the composite or bimetallic blank 5 (Fig. 5) removed. Said blank consists of the filler piece 1 with a covering of noble metal 6 completely surrounding it, save for the projecting stem 4, which may now be cut off flush with the gold layer covering the concave seat 3. If desired, the blank may be positioned in an embossing die, and the detail sharpened up under a press.

The composite blank 5 is now ready to be bent into ring form, as indicated in dotted lines in Fig. 5, the ends of the blank being soldered or brazed. The bending of the blank converts the concave surface 3 into a flat seat or crown upon which any desired emblem or ornament may be secured. The removal of the stem 4 left an exposed portion 7 of base material which is concealed by the base or bezel 8.

Instead of having one side flat, as in Fig. 1, the filler piece may be of the camel-back form 9 shown in Fig. 7 or the form 10 illustrated in Fig. 8, the filler piece, after investment in gold, being bent into ring form. Or the ring may be made of two halves such as the blank shown in different stages in Figs. 9 and 10, the filler piece 11 represented in Fig. 9 being first invested with wax and later with gold in the manner hereinbefore explained. For convenience in securing the filler piece 11 in the die mold and the investment mold, it is provided with a very small projection 12, which has been cut off in Fig. 10. The two halves are soldered, welded or brazed together at top and bottom to form the finished ring illustrated in Fig. 11.

Fig. 12 shows a filler piece 13 made in approximately circular form, which may be invested in a die mold with wax to form a complete band, and then invested with gold to form a ring blank 14 as in Fig. 13.

It will be observed that the ends of the composite blank 5 are of solid gold. The same is true of the composite blanks in which the filler pieces 9, 10 and 11 are utilized. So, also, in the case of the blank 14, the space between the ends of the filler piece 13 is filled with solid gold. Thus in all these forms, that part of the finger ring which receives the most wear is of solid gold.

It will also be noted that in all these variations, the filler piece is completely surrounded by a seamless shell of gold, there being no solder seam between the filler piece and the gold exterior.

One of the prior-art methods of making a bimetallic finger ring (shown, for instance, in the Vaughan Patent No. 1,170,124) involves the use of a short length of bimetallic rod. Said rod has a core of base metal and an outer covering of gold. The ends of the piece of rod are swaged to make them longer, more slender and tapering, the blank thus formed being then bent into ring form. The swaging operation necessarily reduces the thickness of the gold on the end portions of the blank, and as a consequence that part of the ring which receives a great deal of wear, namely, the part at the inner or palm side of the ring, has a very thin covering of gold. My method makes it possible to provide any desired thickness of gold at the point or points that receive the most wear.

The swaged ends of the bimetallic rod, of course, contain a core of base metal; therefore the completed ring is not of solid gold at the inner or palm side. With my method, the inner or palm side of the ring may be of solid gold (see Figs. 6 and 13).

Inasmuch as the filler piece used in my process is completely covered with the noble metal (except the part which is concealed by the emblem, gem or analogous part), the filler piece may be made of cheaper material than if some portion thereof were exposed, or if there were a possibility that some portion of the filler piece might eventually become exposed.

For the sake of brevity, the term "investing material" is used in the following claims to denote any plastic material that may be used to make a mold in which gold or the like may be cast; and the term "wax" signifies any plastic material which melts at a substantially lower temperature than said investing material.

The ring produced by the method herein disclosed is claimed in my divisional application Ser. No. 219,708, filed July 18, 1938.

I claim as my invention:

1. The process of making a composite finger ring which includes the steps of making a filler piece of base material having a mounting stem; covering all of the filler piece except the mounting stem with a coating of wax corresponding in form and external dimensions to the form and external dimensions of a covering of noble metal which is to be cast around the filler piece; investing the coated filler piece with investing material to form a mold in which the filler piece is held by means of the mounting stem; melting the wax and pouring it out of the mold; filling with molten noble metal the space in the mold not occupied by the filler piece; and removing the composite blank thus produced from the mold.

2. The process of making a composite finger ring which consists in making a filler piece of base material having a central portion, two oppositely extending shank portions and a mounting stem; covering said central portion and shank portions with a coating of wax corresponding in form and external dimensions to the form and external dimensions of a covering of noble metal which is to be cast around the central portion and the shank portions of the filler piece; investing the coated filler piece with investing material to form a mold in which the filler piece is held by means of the mounting stem; melting the wax and pouring it out of the mold; filling with molten noble metal the space in the mold not occupied by the filler piece; removing the composite blank thus produced from the mold; removing the mounting stem from the blank; and bending the blank into ring form.

3. The process of making a composite finger ring which consists in making a filler piece of base material having a central portion, two oppositely extending shank portions and a mounting stem; covering said central portion and shank portions with a coating of wax; using the coated filler piece as a pattern in making a mold, said filler piece being held in the cavity of the mold by means of said mounting stem, said cavity corresponding in form and dimensions to the form and external dimensions of a covering of noble metal which is to be cast around the central portion and shank portions of the filler piece; melting the wax and pouring it out of the mold; filling with molten noble metal the space in the mold not occupied by the filler piece; removing the composite blank thus produced from the mold; removing the mounting stem from the blank; and bending the blank into ring form.

4. The process of making a composite finger ring which consists in making a filler piece of base material having a central portion, two oppositely extending shank portions and a mounting stem; mounting the filler piece in the cavity of a die mold by means of the mounting stem, said cavity corresponding in form and dimensions to the form and external dimensions of a covering of noble metal which is to be applied to the filler piece; surrounding the central portion and the shank portions of the filler piece with wax by filling said die mold cavity with wax; removing the filler piece from the die mold and investing it with investing material, said investing material constituting an investment mold in which the filler piece is held by means of said stem; melting the wax and pouring it out of the investment mold; filling with molten noble metal the space in the investment mold previously occupied by the wax; removing the composite blank thus produced from the investment mold; removing the mounting stem from the blank; and bending the blank into ring form.

5. The method of making a bimetallic finger ring which includes the steps of making a filler piece of base metal; coating the filler piece with wax; investing the coated filler piece with investment material; heating the whole to a temperature and for a period sufficient to cause the wax to burn up; filling with molten noble metal the space previously occupied by the wax, whereby the noble metal becomes bonded to the heated filler piece; and removing the blank thus produced from the investment material.

6. A blank for a bimetallic finger ring, comprising a filler blank of base metal, said filler blank having a middle portion, two shank portions extending in opposite directions from the middle portion, and a mounting stem projecting from the middle portion, and a noble metal coating cast around the filler blank and covering the same except the stem, which projects through said coating.

WILLIAM E. ECCLES.